United States Patent
Chinnu et al.

(10) Patent No.: US 12,519,719 B1
(45) Date of Patent: Jan. 6, 2026

(54) MANAGING SYSTEM FAILURE

(71) Applicant: Dell Products L.P., Round Rock, TX (US)

(72) Inventors: Govindasamy Chinnu, Bangalore (IN); Gokul Thiruchengode Vajravel, Bangalore (IN); Shailesh Hastimal Jain, Mahrashtra (IN)

(73) Assignee: Dell Products L.P., Round Rock, TX (US)

( * ) Notice: Subject to any disclaimer, the term of this patent is extended or adjusted under 35 U.S.C. 154(b) by 20 days.

(21) Appl. No.: 18/761,767

(22) Filed: Jul. 2, 2024

(51) Int. Cl.
*H04L 45/42* (2022.01)
*H04L 43/10* (2022.01)
*H04L 45/03* (2022.01)
*H04L 61/4511* (2022.01)

(52) U.S. Cl.
CPC .............. *H04L 45/42* (2013.01); *H04L 43/10* (2013.01); *H04L 45/03* (2022.05); *H04L 61/4511* (2022.05)

(58) Field of Classification Search
CPC ......... H04L 45/42; H04L 43/10; H04L 45/03; H04L 61/4511
See application file for complete search history.

(56) References Cited

U.S. PATENT DOCUMENTS

| | | | | |
|---|---|---|---|---|
| 8,103,906 | B1 * | 1/2012 | Alibakhsh | H04L 67/1001 718/1 |
| 8,719,627 | B2 * | 5/2014 | Watson | G06F 11/3442 714/13 |
| 10,860,368 | B2 * | 12/2020 | Kapur | G06F 11/203 |
| 2012/0297238 | A1 * | 11/2012 | Watson | G06F 9/5088 714/4.11 |
| 2014/0006482 | A1 * | 1/2014 | Raghu | G06Q 40/125 709/203 |
| 2014/0172929 | A1 * | 6/2014 | Sedayao | G06F 3/0661 707/827 |
| 2016/0259802 | A1 * | 9/2016 | Sedayao | G06F 3/067 |
| 2017/0126479 | A1 * | 5/2017 | Vangheepuram | G06F 11/0757 |

(Continued)

FOREIGN PATENT DOCUMENTS

| | | | | |
|---|---|---|---|---|
| CN | 108762193 A | * | 11/2018 | ........... G05B 19/406 |
| CN | 110198516 B | * | 6/2020 | ............. H04L 61/00 |

(Continued)

*Primary Examiner* — Oanh Duong
(74) *Attorney, Agent, or Firm* — McDermott Will & Schulte LLP (57) ABSTRACT

Managing system failure, including establishing, by a distributed service server and for each of a plurality of cloud service providers (CSPs), a respective connection with each of the CSPs; after establishing the respective connection with each of the CSPs, receiving, from each of the CSPs, details of the CSP and of the connection between the CSP and the distributed service server; updating a CSP table including the received details for each of the CSPs, the CSP table indicating a listed order of the CSPs; determining that a heartbeat signal has not been received from an application layer of a current CSP in a time period, and in response: marking the current CSP as inactive in the CSP table; identifying a next available CSP of the table; providing instructions to a domain registrar, in communication with each of the CSPs, to update a DNS configuration to indicate the next available CSP.

18 Claims, 6 Drawing Sheets

(56) References Cited

U.S. PATENT DOCUMENTS

| | | | | |
|---|---|---|---|---|
| 2019/0026139 A1* | 1/2019 | Park | .......................... | G06F 9/50 |
| 2021/0141346 A1* | 5/2021 | Wenzel | .................. | G05B 15/02 |
| 2022/0365495 A1* | 11/2022 | Wenzel | ............... | H04L 43/0811 |

FOREIGN PATENT DOCUMENTS

| | | | | | |
|---|---|---|---|---|---|
| CN | 116614508 A | * | 8/2023 | ......... | H04L 67/1012 |
| CN | 117961894 A | * | 5/2024 | ............ | B25J 9/1602 |

* cited by examiner

MANAGING SYSTEM FAILURE

BACKGROUND

Field of the Disclosure

The disclosure relates generally to an information handling system, and in particular, managing system failure of an information handling system.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes, thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

A cloud outage occurs when a cloud provider's services become unavailable to end-users. This can happen due to various reasons, such as bugs, power failures, or other infrastructure issues. During an outage, clients lose access to their cloud-based assets until the provider resolves the issue.

SUMMARY

Innovative aspects of the subject matter described in this specification may be embodied in a method of managing system failure, including establishing, by a distributed service server and for each of a plurality of cloud service providers (CSPs), a respective connection with each of the CSPs; after establishing the respective connection with each of the CSPs, receiving, from each of the CSPs, details of the CSP and of the connection between the CSP and the distributed service server; updating a CSP table including the received details for each of the CSPs, the CSP table indicating a listed order of the CSPs; determining that a heartbeat signal has not been received from an application layer of a current CSP in a time period, and in response: marking the current CSP as inactive in the CSP table; identifying a next available CSP of the table; and providing instructions to a domain registrar, in communication with each of the CSPs, to update a domain name system (DNS) configuration to indicate the next available CSP.

Other embodiments of these aspects include corresponding systems, apparatus, and computer programs, configured to perform the actions of the methods, encoded on computer storage devices.

These and other embodiments may each optionally include one or more of the following features. For instance, routing communication from a client information handling system to the next available CSP. Determining that the heartbeat signal has been received from an application layer of the next available CSP in the time period, and in response, maintaining the active indication in the CSP table for the next available CSP. Determining that the heartbeat signal has not been received from an application layer of the next available CSP in the time period, and in response: marking the next available CSP as inactive in the CSP table; identifying a further next available CSP of the table; and providing instructions to the domain registrar to update the DNS configuration to indicate the further next available CSP. The plurality of CSPs are separate cloud infrastructures. At least one of the CSPs is on-premise for a client information handling system, and the remaining CSPs are separate cloud infrastructures.

The details of one or more embodiments of the subject matter described in this specification are set forth in the accompanying drawings and the description below. Other potential features, aspects, and advantages of the subject matter will become apparent from the description, the drawings, and the claims.

DESCRIPTION OF PARTICULAR EMBODIMENT(S)

This disclosure discusses methods and systems for managing system failure of an information handling system. Specifically, this disclosure discusses a system and a method for managing system failure, including establishing, by a distributed service server and for each of a plurality of cloud service providers (CSPs), a respective connection with each of the CSPs; after establishing the respective connection with each of the CSPs, receiving, from each of the CSPs, details of the CSP and of the connection between the CSP and the distributed service server; updating a CSP table including the received details for each of the CSPs, the CSP table indicating a listed order of the CSPs; determining that a heartbeat signal has not been received from an application layer of a current CSP in a time period, and in response: marking the current CSP as inactive in the CSP table; identifying a next available CSP of the table; and providing instructions to a domain registrar, in communication with each of the CSPs, to update a domain name system (DNS) configuration to indicate the next available CSP.

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such as wires, optical fibers, microwaves, radio waves, and other electromagnetic and/or optical carriers; and/or any combination of the foregoing.

Particular embodiments are best understood by reference to FIGS. 1-6 wherein like numbers are used to indicate like and corresponding parts.

Figure 1:
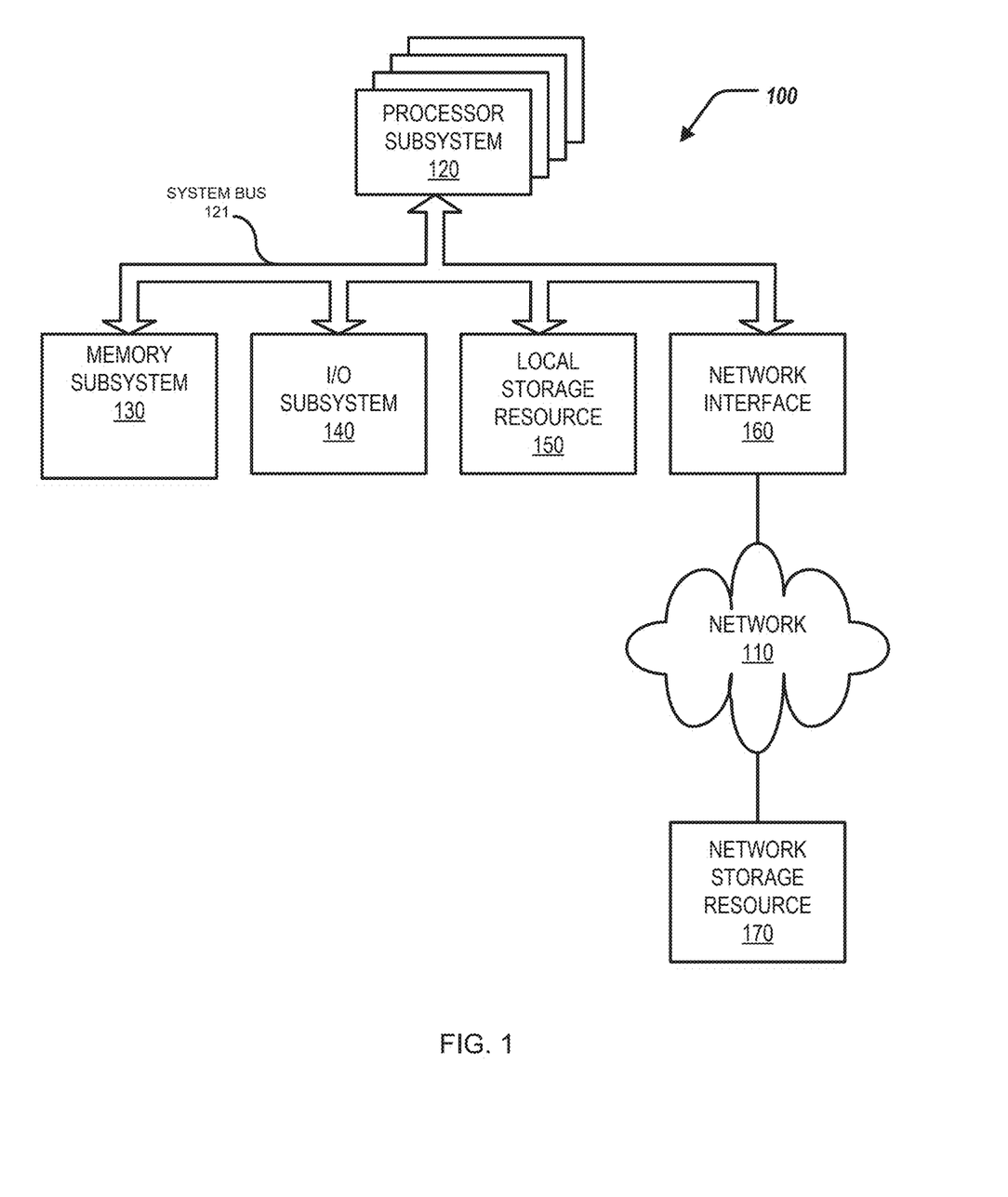
FIG. 1 is a block diagram of selected elements of an embodiment of an information handling system.

Turning now to the drawings, FIG. 1 illustrates a block diagram depicting selected elements of an information handling system 100 in accordance with some embodiments of the present disclosure. In various embodiments, information handling system 100 may represent different types of portable information handling systems, such as, display devices, head mounted displays, head mount display systems, smart phones, tablet computers, notebook computers, media players, digital cameras, 2-in-1 tablet-laptop combination computers, and wireless organizers, or other types of portable information handling systems. In one or more embodiments, information handling system 100 may also represent other types of information handling systems, including desktop computers, server systems, controllers, and microcontroller units, among other types of information handling systems. Components of information handling system 100 may include, but are not limited to, a processor subsystem 120, which may comprise one or more processors, and system bus 121 that communicatively couples various system components to processor subsystem 120 including, for example, a memory subsystem 130, an I/O subsystem 140, a local storage resource 150, and a network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

As depicted in FIG. 1, processor subsystem 120 may comprise a system, device, or apparatus operable to interpret and/or execute program instructions and/or process data, and may include one or more processing resources such as a central processing unit (CPU), microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and/or execute program instructions and/or process data stored locally (e.g., in memory subsystem 130 and/or another component of the information handling system). In the same or alternative embodiments, processor subsystem 120 may interpret and/or execute program instructions and/or process data stored remotely (e.g., in network storage resource 170).

Also in FIG. 1, memory subsystem 130 may comprise a system, device, or apparatus operable to retain and/or retrieve program instructions and/or data for a period of time (e.g., computer-readable media). Memory subsystem 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 100, is powered down.

In information handling system 100, I/O subsystem 140 may comprise a system, device, or apparatus generally operable to receive and/or transmit data to/from/within information handling system 100. I/O subsystem 140 may represent, for example, a variety of communication interfaces, graphics interfaces, video interfaces, user input interfaces, and/or peripheral interfaces. In various embodiments, I/O subsystem 140 may be used to support various peripheral devices, such as a touch panel, a display adapter, a keyboard, an accelerometer, a touch pad, a gyroscope, an IR sensor, a microphone, a sensor, a camera, or another type of peripheral device.

Local storage resource 150 may comprise computer-readable media (e.g., hard disk drive, floppy disk drive, CD-ROM, and/or other types of rotating storage media, flash memory, EEPROM, and/or another type of solid state storage media) and may be generally operable to store instructions and/or data. Likewise, the network storage resource may comprise computer-readable media (e.g., hard disk drive, floppy disk drive, CD-ROM, and/or other types of rotating storage media, flash memory, EEPROM, and/or other types of solid state storage media) and may be generally operable to store instructions and/or data.

In FIG. 1, network interface 160 may be a suitable system, apparatus, or device operable to serve as an interface between information handling system 100 and a network 110. Network interface 160 may enable information handling system 100 to communicate over network 110 using a suitable transmission protocol and/or standard, including, but not limited to, transmission protocols and/or standards enumerated below with respect to the discussion of network 110. In some embodiments, network interface 160 may be communicatively coupled via network 110 to a network storage resource 170. Network 110 may be a public network or a private (e.g., corporate) network. The network may be implemented as, or may be a part of, a storage area network (SAN), a personal area network (PAN), a local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). Network interface 160 may enable wired and/or wireless communications (e.g., NFC or Bluetooth) to and/or from information handling system 100.

In particular embodiments, network 110 may include one or more routers for routing data between client information handling systems 100 and server information handling systems 100. A device (e.g., a client information handling system 100 or a server information handling system 100) on network 110 may be addressed by a corresponding network address including, for example, an Internet protocol (IP) address, an Internet name, a Windows Internet name service (WINS) name, a domain name or other system name. In particular embodiments, network 110 may include one or more logical groupings of network devices such as, for example, one or more sites (e.g., customer sites) or subnets. As an example, a corporate network may include potentially thousands of offices or branches, each with its own subnet (or multiple subnets) having many devices. One or more client information handling systems 100 may communicate with one or more server information handling systems 100 via any suitable connection including, for example, a modem connection, a LAN connection including the Ethernet, or a broadband WAN connection including DSL, Cable, Ti, T3, Fiber Optics, Wi-Fi, or a mobile network connection including GSM, GPRS, 3G, or WiMax.

Network 110 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 110 and its various components may be implemented using hardware, software, or any combination thereof.

Figure 2:
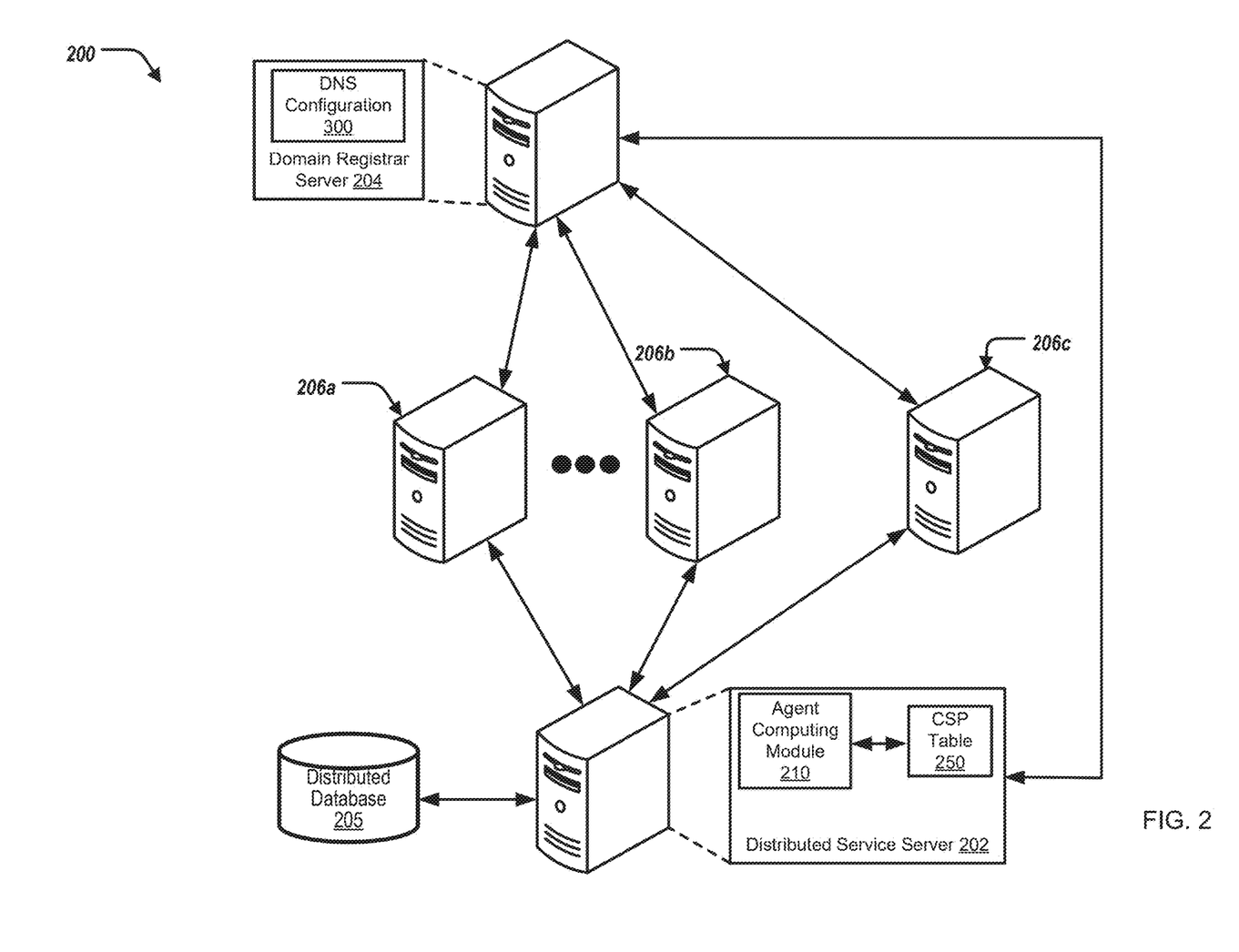
FIG. 2 illustrates a block diagram of a computing environment for managing system failure of an information handling system.

Turning to FIG. 2, FIG. 2 illustrates an environment 200 including distributed service server 202, a domain registrar server 204, a distributed database 205, and cloud service providers 206a, 206b, 206c (collectively referred to as cloud service providers (CSPs) 206); however, the environment 200 can include any number of CSPs 206. The distributed service server 202 can include an agent computing module 210. In some examples, the distributed service server 202 is similar to, or includes, the information handling system 100 of FIG. 1. In some examples, the domain registrar server 204 is similar to, or includes, the information handling system 100 of FIG. 1. In some examples, each of the CSPs 206 are similar to, or include, the information handling system 100 of FIG. 1.

The distributed service server 202 can be in communication with the domain registrar server 204, the CSPs 206, and the distributed database 205. The CSPs 206 can be in communication with the distributed service server 202 and the domain registrar server 204. The domain registrar server 204 can be in communication with the distributed service server 202 and the CSPs 206.

Each of CSPs 206 can access the distributed database 205. In some examples, each of the CSPs 206 can access the distributed database 205 indirectly through the distributed service server 202. In some examples, each of the CSPs 206 can access the distributed database 205 directly.

In some examples, the CSPs 206 are each associated with a separate cloud infrastructure. For example, the CSP 206a can be a first cloud computing infrastructure (or part of a first cloud computing infrastructure); the CSP 206b can be a second cloud computing infrastructure (or part of a second cloud computing infrastructure); and the CSP 206c can be a third cloud computing infrastructure (or part of a third cloud computing infrastructure). The first cloud computing infrastructure, the second cloud computing infrastructure, and the third cloud computing infrastructure can all be distinct and separate cloud computing infrastructures.

In some examples, the CSP 206c is a client information handling system. That is, the CSP 206c is on-premise or on-site for the client information handling system. In some examples, the client information handling system can be a separate information handling system. In some examples, the client information handling system can be in communication with the distributed service server 202, the domain registrar server 204, the CSPs 206, or a subset thereof.

Figure 3:
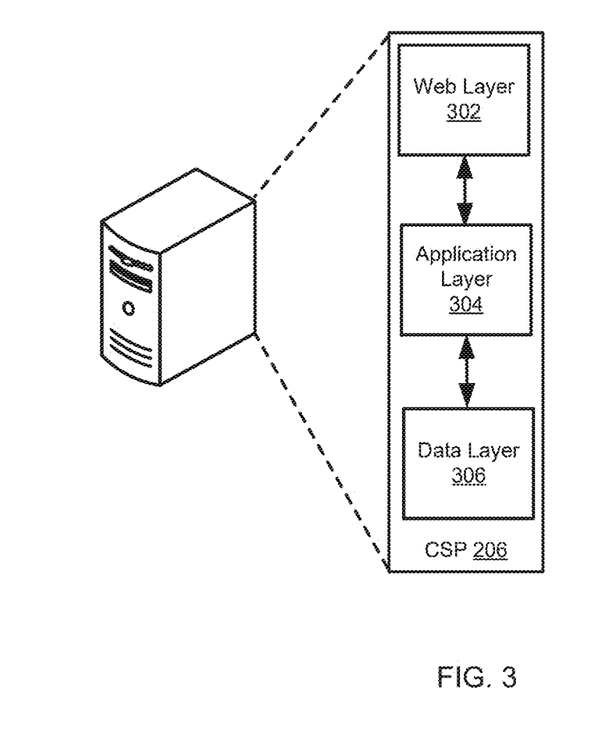
FIG. 3 illustrates a block diagram of a cloud service provider.

FIG. 3 illustrates the CSP 206. The CSP 206 can include a web layer 302, an application layer 304, and a data layer 306. The web layer 302 can be in communication with the application layer 304. The application layer 304 can be in communication with the web layer 302 and the data layer 306. The data layer 306 can be in communication with the application layer 304. The web layer 210, in short, can provide and manage a user interface of a website or web application (design, layout); render HTML, CSS, and JavaScript code for the CSP 206; handle user interactions; display content; and provide communication with the application layer 304 for data retrieval and updates. The application layer 304, in short, can process user requests; generate responses to the requests; interact with the data layer 306, APIs, and services thereof; retrieve and manipulate data of the data layer 306; and manage user authentication and session management. The data layer 306 provides access to data, e.g., the data at the distributed database 205.

In short, the environment 200 can facilitate distribution of the web layer 302, the application layer 304, and the data layer 306 across the CSPs 206 (including on-premise infrastructure) for zero-down time service level agreements (SLAs). The environment 200 is scalable across CSP vendors and web layers and application layers, as well as endpoint devices (client information handling systems) and operating systems thereof. The environment 200 can include a hybrid/multi-cloud infrastructure distribution architecture that includes customer-specific web and app containers that are dispersed across multiple CSPs 206 and on premise (e.g., CSP 206c). In the event of a failure/disaster, the containers in various cloud or on-premise CSPs will be called into service to allow continued functionality. That is, during such a failure/disaster, a secondary CSP will accept requests and route them to the secondary site, allowing the environment 200 to continue operations without interruption. The secondary CSP will switch to the primary status, causing the devices to connect to the secondary URL.

Figure 4:
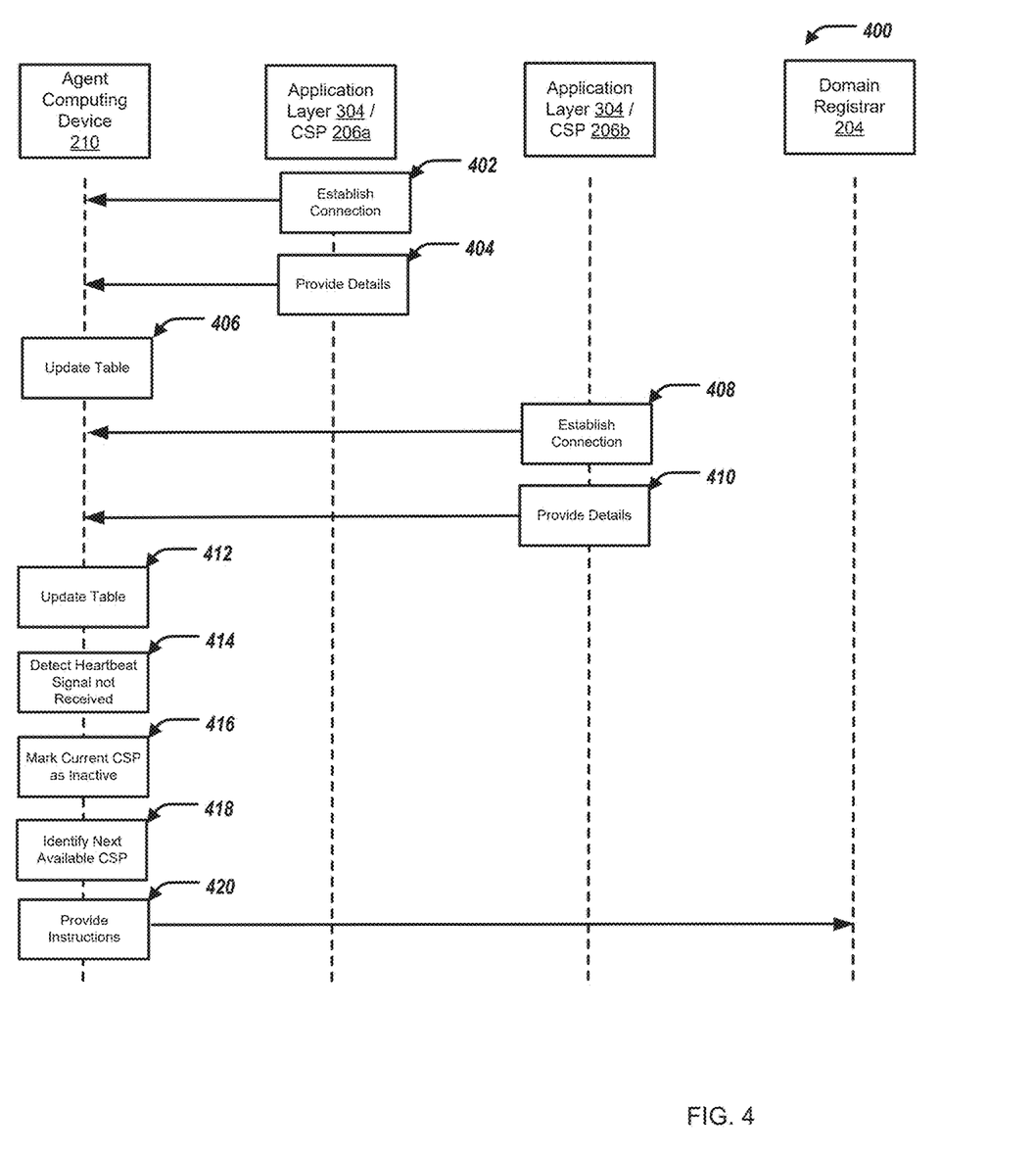
FIG. 4 illustrates a swim-lane diagram for managing system failure of an information handling system.

FIG. 4 illustrates a swim-lane diagram depicting selected elements of an embodiment of a method 400 for managing system failure of an information handling system. The method 400 may be performed by the information handling system 100, the distributed service server 202, the agent computing module 210, the domain registrar server 204, and/or the CSPs 206, and with reference to FIGS. 1-3. It is noted that certain operations described in method 400 may be optional or may be rearranged in different embodiments.

The application layer 304 of the CSP 206a establishes a connection with the agent computing module 210 of the distributed service server 202, at 402. After establishing the session between the CSP 206a and the distributed service server 202, the CSP 206a provides details of the CSP 206a and details of the connection between the CSP 206a and the distributed service server 202, at 404. For example, the details can include a name or identifier of the CSP 206a, a unique address (Internet Protocol (IP)) of the CSP 206a, and a status of the CSP 206a (e.g., unavailable, active, inactive, and the like).

The agent computing module 210 at the distributed service server 202 updates a CSP table 250, at 406. Specifically, the agent computing module 210 updates the CSP table 250 to include the received details of the CSP 206a, such as identifier, IP address, and status.

The application layer 304 of the CSP 206b establishes a connection with the agent computing module 210 of the distributed service server 202, at 408. After establishing the session between the CSP 206b and the distributed service server 202, the CSP 206b provides details of the CSP 206b and details of the connection between the CSP 206b and the distributed service server 202, at 410. For example, the details can include a name or identifier of the CSP 206b, a unique address (Internet Protocol (IP)) of the CSP 206b, and a status of the CSP 206b (e.g., unavailable, active, inactive, and the like).

The agent computing module 210 at the distributed service server 202 updates the CSP table 250, at 412. Specifically, the agent computing module 210 updates the CSP table 250 to include the received details of the CSP 206b, such as identifier, IP address, and status.

In short, the agent computing module 210 can establish sessions with each of the CSPs 206, and then receive details from each of the CSPs 206. The agent computing module 210 can then update the CSP table 250 for each of the CSPs 206.

Furthermore, after receiving the details of each of the CSPs 206, the agent computing module 210 updates the CSP table 250 to include a listed order of the CSPs 206. The initial order of the CSPs of the CSP table 250 can be based on one or more key performance indicators (KPIs) such as least cost CSP (CSPs listed from lesser cost to higher costs (ascending order)); least failure CSP (CSPs listed in the order of having lesser failure history); least latency (or high performance) CSP (CSPs listed in the order of higher performance). In some examples, the initial order of the CSPs is randomized. Table 1 below shows an example of the CSP table 250.

TABLE 1

| #/Index | CSP Identifier | IP address | Status |
|---|---|---|---|
| 1 | CSP 206a | 203.0.113.45 | Active |
| 2 | CSP 206b | 104.16.249.249 | Active |
| 3 | CSP 206c | 54.239.26.214 | Active |

The agent computing module 210 at the distributed service server 202 determines that a heartbeat signal has not been received from an application layer 304 of a current CSP 206 in a time period, at 414. Specifically, the agent computing module 210 determines that a heartbeat signal has not been received from the application layer 304 of the CSP 206 that is indicated at the top of the CSP table 250—that is, CSP 206a. The CSP 206a does not send the heartbeat signal to the distributed service server 202 within the time period—e.g., due to malfunction or failure of the CSP 206a.

The agent computing module 210 at the distributed service server 202, in response to determining that the heartbeat signal has not been received from the application layer 304 of the current CSP 206a in the time period, marks the current CSP 206a as inactive in the CSP table 250, at 416, as shown by Table 2.

TABLE 2

| #/Index | CSP Identifier | IP address | Status |
|---|---|---|---|
| 1 | CSP 206a | 203.0.113.45 | Unavailable |
| 2 | CSP 206b | 104.16.249.249 | Active |
| 3 | CSP 206c | 54.239.26.214 | Active |

In some examples, the agent computing module 210 at the distributed service server 202, in response to determining that the heartbeat signal has not been received from the application layer 304 of the current CSP 206a in the time period, adjusts the order of the CSP table 250 such that CSP 206a is now listed at the end (last) of the CSP table 250, as shown in Table 3.

TABLE 3

| #/Index | CSP Identifier | IP address | Status |
|---|---|---|---|
| 1 | CSP 206b | 104.16.249.249 | Active |
| 2 | CSP 206c | 54.239.26.214 | Active |
| 3 | CSP 206a | 203.0.113.45 | Unavailable |

The agent computing module 210 at the distributed service server 202, further in response to determining that the heartbeat signal has not been received from the application layer 304 of the current CSP 206a in the time period, identifies a next available CSP 206 of the CSP table 250, at 418. Specifically, the agent computing module 210 identifies the CSP 206b as the next available CSP based on either Table 2 or Table 3. That is, in reference to Table 2, as the CSP 206a is marked as unavailable, the agent computing module 210 identifies the CSP 206b as the next active/available CSP in the CSP table 250. That is, in reference to Table 3, the CSP 206b is the CSP 206 that is listed at the top of the CSP table 250.

The agent computing module 210 at the distributed service server 202, further in response to determining that the heartbeat signal has not been received from the application layer 304 of the current CSP 206a in the time period, provides instructions to the domain registrar 204, at 420. Specifically, the agent computing module 210 provides instructions to the domain registrar 204 to update a domain name system (DNS) configuration to indicate the next available CSP 206b. That is, any requests for communication or data are routed to the CSP 206b (from the previous CSP 206a); for example, requests for data from the distributed database 205.

Figure 5:
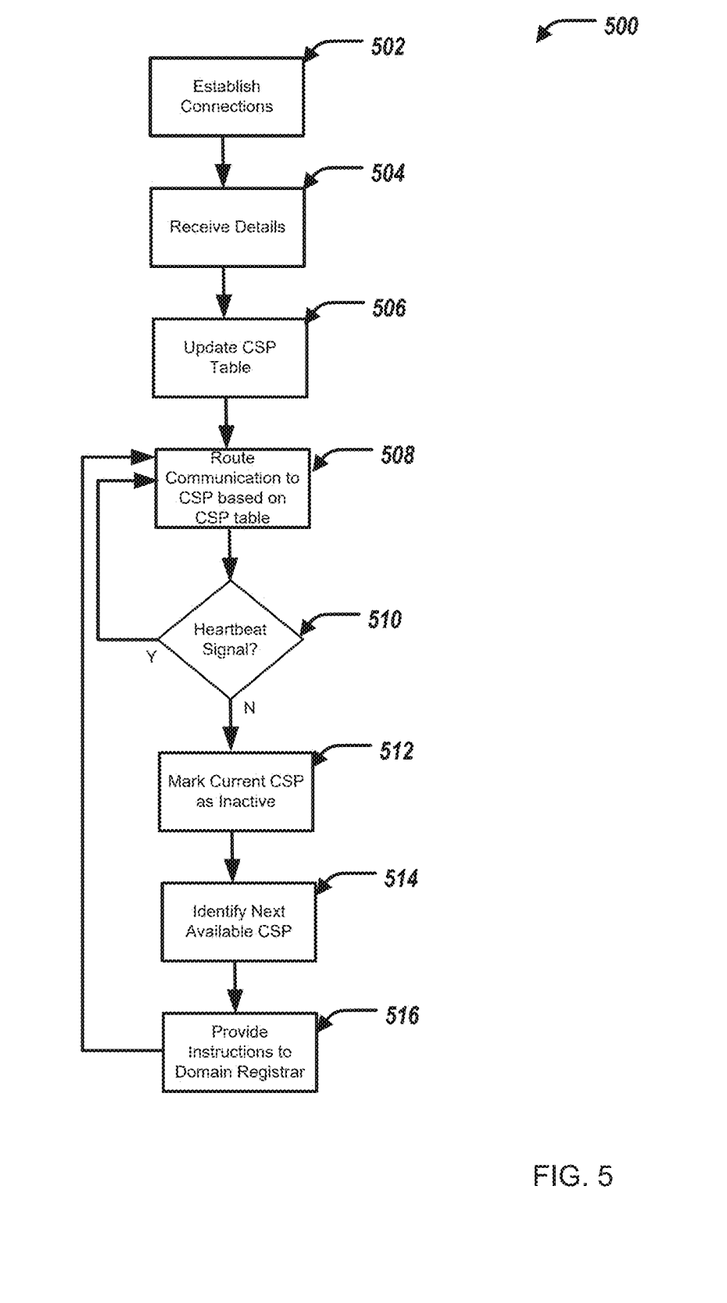
FIG. 5 illustrates a method for managing system failure of an information handling system.

FIG. 5 illustrates a flowchart depicting selected elements of an embodiment of a method 500 for managing system failure of an information handling system. The method 500 may be performed by the information handling system 100, the distributed service server 202, the agent computing module 210, the domain registrar server 204, and/or the CSPs 206, and with reference to FIGS. 1-3. It is noted that certain operations described in method 500 may be optional or may be rearranged in different embodiments.

The application layer 304 of each of the CSPs 206 establishes a respective connection with the agent computing module 210 of the distributed service server 202, at 502. Each of the CSPs 206 provide details thereof and details of the connection between the respective CSP 206 and the distributed server service 202, at 504. The agent computing module 210 at the distributed service server 202 updates the CSP table 250, at 506. Specifically, the agent computing module 210 updates the CSP table 250 to include the received details of each of the CSPs 206, such as identifier, IP address, and status.

The domain registrar 204 and/or the distributed service server 202 routes communication based on the CSP table 250, at 508. For example, when a client information handling system (e.g., the CSP 206c) requests or provides data, the domain registrar 204 and/or the distributed service server 202 routes such communication based on the CSP table 250. For example, the communication can be routed through the CSP 206a based on Table 1.

The agent computing module 210 at the distributed service server 202 determines whether a heartbeat signal has been received from the application layer 304 of a current CSP 206 in a time period, at 510. For example, the agent computing module 210 determines whether a heartbeat signal has been received from the application layer 304 of the CSP 206a that is indicated at the top of the CSP table 250 based on Table 1.

In some examples, the agent computing module 210 at the distributed service server 202 determines that a heartbeat signal has not been received from the application layer 304 of the CSP 206a in the time period. In response, the agent computing module 210 at the distributed service server 202 marks the CSP 206a as inactive/unavailable in the CSP table 250, at 512, as shown by Table 2.

The agent computing module 210 at the distributed service server 202, further in response to determining that the heartbeat signal has not been received from the application layer 304 of the CSP 206a in the time period, identifies a next available CSP 206 of the CSP table 250, at 514. Specifically, the agent computing module 210 identifies the CSP 206b as the next available CSP based on either Table 2 or Table 3.

The agent computing module 210 at the distributed service server 202, further in response to determining that the heartbeat signal has not been received from the application layer 304 of the CSP 206a in the time period, provides instructions to the domain registrar 204, at 516. Specifically, the agent computing module 210 provides instructions to the domain registrar 204 to update a domain name system (DNS) configuration to indicate the next available CSP 206. Specifically, the agent computing module 210 provides instructions to the domain registrar 204 to update the DNS configuration to indicate the next available CSP 206 as the CSP 206b. That is, any requests for communication or data (e.g., from a client information handling system) are routed to the next available CSP. For example, any requests for communication or data (e.g., from a client information handling system) are routed to the CSP 206b. The method proceeds back to step 508.

In some examples, the agent computing module 210 at the distributed service server 202 determines that a heartbeat signal has been received from the application layer 304 of the CSP 206a in the time period (at 510). In response, the agent computing module 210 at the distributed service server 202 maintains the active indication in the CSP table 250 for the next available CSP. That is, the agent computing module 210 maintains the active indication in the CSP table 250 that the CSP 206b is active/available and proceeds to step 508—routes communication to the CSP 206b based on the CSP table 250, at 508.

Continuing, in some examples, the agent computing module 210 at the distributed service server 202 determines that a heartbeat signal has not been received from the application layer 304 of the CSP 206b in the time period, at 510. In response, the agent computing module 210 at the distributed service server 202 marks the CSP 206b as inactive/unavailable in the CSP table 250, at 512, as shown by Table 4.

TABLE 4

| #/Index | CSP Identifier | IP address | Status |
| --- | --- | --- | --- |
| 1 | CSP 206a | 203.0.113.45 | Unavailable |
| 2 | CSP 206b | 104.16.249.249 | Unavailable |
| 3 | CSP 206c | 54.239.26.214 | Active |

The agent computing module 210 at the distributed service server 202, further in response to determining that the heartbeat signal has not been received from the application layer 304 of the CSP 206b in the time period, identifies a next available CSP 206 of the CSP table 250, at 514. Specifically, the agent computing module 210 identifies the CSP 206c as the next available CSP based on Table 4.

The agent computing module 210 at the distributed service server 202, further in response to determining that the heartbeat signal has not been received from the application layer 304 of the CSP 206b in the time period, provides instructions to the domain registrar 204, at 516. Specifically, the agent computing module 210 provides instructions to the domain registrar 204 to update the DNS configuration to indicate the next available CSP 206. Specifically, the agent computing module 210 provides instructions to the domain registrar 204 to update the DNS configuration to indicate the next available CSP 206 as the CSP 206c. That is, any requests for communication or data (e.g., from a client information handling system) are routed to the next available CSP. For example, any requests for communication or data (e.g., from a client information handling system) are routed to the CSP 206c. For example, requests for data from the distributed database 205.

Figure 6:
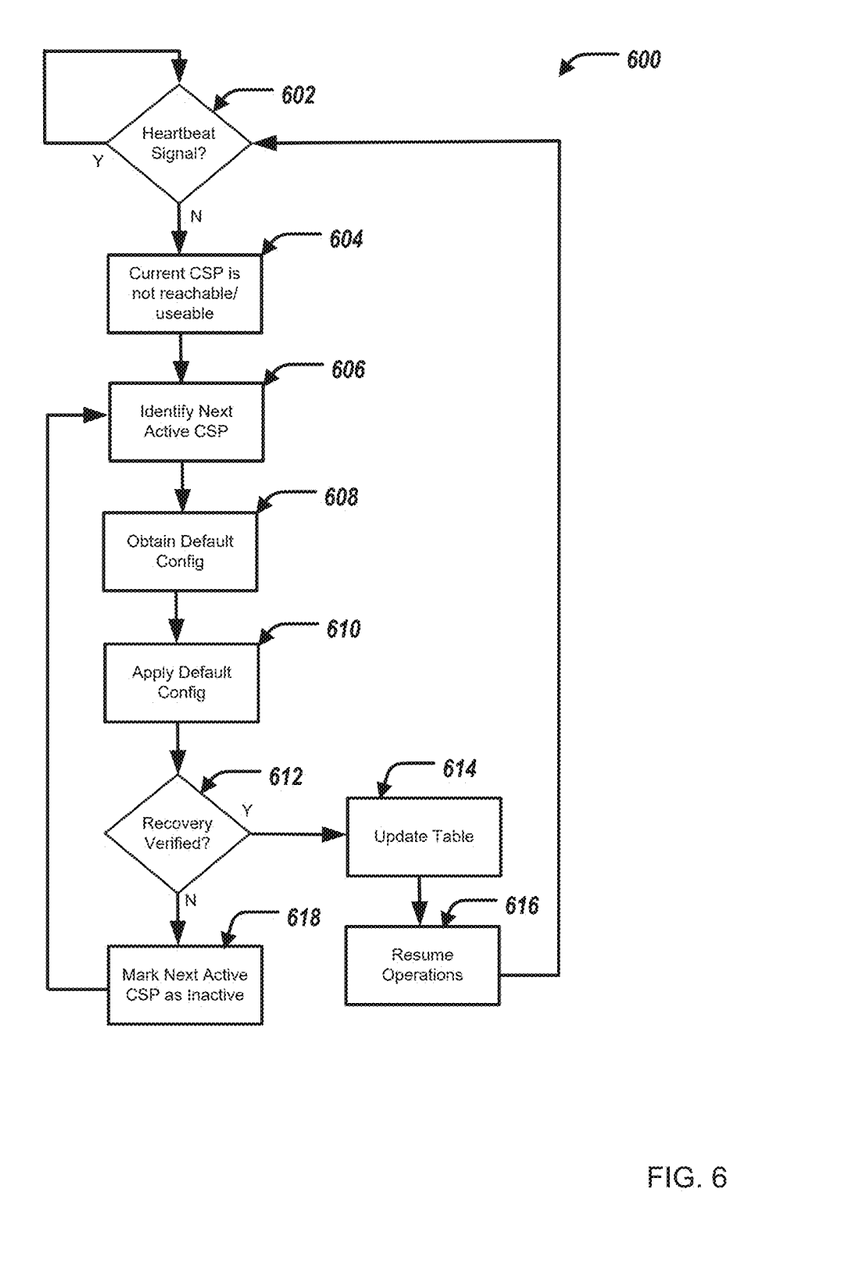
FIG. 6 illustrates a method for managing system failure of an information handling system.

FIG. 6 illustrates a flowchart depicting selected elements of an embodiment of a method 600 for managing system failure of an information handling system. The method 600 may be performed by the information handling system 100, the distributed service server 202, the agent computing module 210, the domain registrar server 204, and/or the CSPs 206, and with reference to FIGS. 1-3. It is noted that certain operations described in method 600 may be optional or may be rearranged in different embodiments.

The agent computing module 210 at the distributed service server 202 determines whether a heartbeat signal has been received from the application layer 304 of a current CSP 206 in a time period, at 602. If a heartbeat signal has been received, the method returns back to step 602. When a heartbeat signal has not been received within the time period, the agent computing module 210 determines that the current CSP 206 is not reachable/useable (identifies the current CSP 206 is not reachable/useable), at 604. The agent computing module 210 identifies the next available active CSP 206 based on the CSP table 250, at 606. The agent computing module 210 obtains a default configuration of the previous CSP 206 (the failed CSP 206 that did not provide the heartbeat signal), at 608. The agent computing module 210 can recover the default configuration from a backup (maintained in the distributed database 205). The agent computing module 210 can apply the default configuration (if any) to the next available CSP 206, at 610. The agent computing module 210 can verify if the recovery was successful, at 612. That is, the agent computing module 210 verifies if the transition to the next available CSP 206 was successful. When it is determined that the recovery was successful, the agent computing module 210 updates the CSP table 250 to indicate the next available CSP 206 is at the top of the table/queue, at 614. Further, the CSP table 250 is updated to note that the previous CSP 206 is inactive/unavailable. Normal operations are resumed, at 616. That is, communication between the client information handling system and the next available CSP 206 are resumed. The method proceeds back to step 602. When it is determined that the recovery was unsuccessful, the agent computing module 210 marks the next available CSP 206 as unavailable/inactive, at 618, and the method returns to step 606. Further, the agent computing module 210 captures the logs for analysis.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

What is claimed is:

1. A computer-implemented method of managing system failure, the method comprising:

establishing, by a distributed service server and for each of a plurality of cloud service providers (CSPs), a respective connection with each of the CSPs;

after establishing the respective connection with each of the CSPs, receiving, from each of the CSPs, details of the CSP and of the connection between the CSP and the distributed service server;

updating a CSP table including the received details for each of the CSPs, the CSP table indicating a listed order of the CSPs;

determining that a heartbeat signal has not been received from an application layer of a current CSP in a time period, and in response:

marking the current CSP as inactive in the CSP table;

identifying a next available CSP of the table; and providing instructions to a domain registrar, in communication with each of the CSPs, to update a domain name system (DNS) configuration to indicate the next available CSP.

2. The computer-implemented method of claim 1, further including:

routing communication from a client information handling system to the next available CSP.

3. The computer-implemented method of claim 1, further including:

determining that the heartbeat signal has been received from an application layer of the next available CSP in the time period, and in response, maintaining the active indication in the CSP table for the next available CSP.

4. The computer-implemented method of claim 1, further including:

determining that the heartbeat signal has not been received from an application layer of the next available CSP in the time period, and in response:

marking the next available CSP as inactive in the CSP table;

identifying a further next available CSP of the table; and providing instructions to the domain registrar to update the DNS configuration to indicate the further next available CSP.

5. The computer-implemented method of claim 1, wherein the plurality of CSPs are separate cloud infrastructures.

6. The computer-implemented method of claim 1, wherein at least one of the CSPs is on-premise for a client information handling system, and the remaining CSPs are separate cloud infrastructures.

7. An information handling system comprising a processor having access to memory media storing instructions executable by the processor to perform operations, comprising:

establishing, by a distributed service server and for each of a plurality of cloud service providers (CSPs), a respective connection with each of the CSPs;

after establishing the respective connection with each of the CSPs, receiving, from each of the CSPs, details of the CSP and of the connection between the CSP and the distributed service server;

updating a CSP table including the received details for each of the CSPs, the CSP table indicating a listed order of the CSPs;

determining that a heartbeat signal has not been received from an application layer of a current CSP in a time period, and in response:

marking the current CSP as inactive in the CSP table;

identifying a next available CSP of the table; and providing instructions to a domain registrar, in communication with each of the CSPs, to update a domain name system (DNS) configuration to indicate the next available CSP.

8. The information handling system of claim 7, the operations further including:
routing communication from a client information handling system to the next available CSP.

9. The information handling system of claim 7, the operations further including:
determining that the heartbeat signal has been received from an application layer of the next available CSP in the time period, and in response, maintaining the active indication in the CSP table for the next available CSP.

10. The information handling system of claim 7, the operations further including:
determining that the heartbeat signal has not been received from an application layer of the next available CSP in the time period, and in response:
marking the next available CSP as inactive in the CSP table;
identifying a further next available CSP of the table; and
providing instructions to the domain registrar to update the DNS configuration to indicate the further next available CSP.

11. The information handling system of claim 7, wherein the plurality of CSPs are separate cloud infrastructures.

12. The information handling system of claim 7, wherein at least one of the CSPs is on-premise for a client information handling system, and the remaining CSPs are separate cloud infrastructures.

13. A non-transitory computer-readable medium storing software comprising instructions executable by one or more computers which, upon such execution, cause the one or more computers to perform operations comprising:
establishing, by a distributed service server and for each of a plurality of cloud service providers (CSPs), a respective connection with each of the CSPs;
after establishing the respective connection with each of the CSPs, receiving, from each of the CSPs, details of the CSP and of the connection between the CSP and the distributed service server;
updating a CSP table including the received details for each of the CSPs, the CSP table indicating a listed order of the CSPs;
determining that a heartbeat signal has not been received from an application layer of a current CSP in a time period, and in response:
marking the current CSP as inactive in the CSP table;
identifying a next available CSP of the table; and
providing instructions to a domain registrar, in communication with each of the CSPs, to update a domain name system (DNS) configuration to indicate the next available CSP.

14. The non-transitory computer-readable medium of claim 13, the operations further including:
routing communication from a client information handling system to the next available CSP.

15. The non-transitory computer-readable medium of claim 13, the operations further including:
determining that the heartbeat signal has been received from an application layer of the next available CSP in the time period, and in response, maintaining the active indication in the CSP table for the next available CSP.

16. The non-transitory computer-readable medium of claim 13, the operations further including:
determining that the heartbeat signal has not been received from an application layer of the next available CSP in the time period, and in response:
marking the next available CSP as inactive in the CSP table;
identifying a further next available CSP of the table; and
providing instructions to the domain registrar to update the DNS configuration to indicate the further next available CSP.

17. The non-transitory computer-readable medium of claim 13, wherein the plurality of CSPs are separate cloud infrastructures.

18. The non-transitory computer-readable medium of claim 13, wherein at least one of the CSPs is on-premise for a client information handling system, and the remaining CSPs are separate cloud infrastructures.

* * * * *